(12) United States Patent
Zhang

(10) Patent No.: US 8,347,075 B1
(45) Date of Patent: Jan. 1, 2013

(54) METHODS TO MITIGATE ATTACKS AGAINST FIBER-TO-THE-HOME NETWORK SYSTEMS

(75) Inventor: Muxiang Zhang, Malden, MA (US)

(73) Assignee: Verizon Laboratories Inc., Waltham, MA (US)

( * ) Notice: Subject to any disclaimer, the term of this patent is extended or adjusted under 35 U.S.C. 154(b) by 3197 days.

(21) Appl. No.: 10/285,826

(22) Filed: Nov. 1, 2002

Related U.S. Application Data

(60) Provisional application No. 60/332,904, filed on Nov. 14, 2001.

(51) Int. Cl.
| | |
|---|---|
| H04L 29/06 | (2006.01) |
| G06F 15/16 | (2006.01) |
| G06F 12/14 | (2006.01) |
| G06F 15/173 | (2006.01) |
| H04K 1/00 | (2006.01) |
| H04B 10/00 | (2006.01) |

(52) U.S. Cl. .............. 713/154; 713/161; 726/3; 726/22; 380/256; 709/224; 709/238; 398/40; 398/115; 398/140

(58) Field of Classification Search ............. 726/12, 726/3, 22; 713/154, 161; 709/224, 238; 380/256; 398/40, 115, 140
See application file for complete search history.

(56) References Cited

U.S. PATENT DOCUMENTS

| | | | | |
|---|---|---|---|---|
| 5,768,526 | A * | 6/1998 | Fawcett | 709/229 |
| 5,911,019 | A | 6/1999 | Cohen | 385/24 |
| 6,151,324 | A * | 11/2000 | Belser et al. | 370/397 |
| 6,295,148 | B1 | 9/2001 | Atlas | 359/125 |
| 6,385,366 | B1 | 5/2002 | Lin | 385/24 |
| 6,559,989 | B1 * | 5/2003 | Kim et al. | 398/101 |
| 6,594,227 | B1 * | 7/2003 | Ogawa et al. | 370/216 |
| 6,928,478 | B1 * | 8/2005 | Gangadharan | 709/226 |
| 7,051,369 | B1 * | 5/2006 | Baba | 726/23 |
| 7,171,453 | B2 * | 1/2007 | Iwami | 709/218 |
| 2002/0186698 | A1 * | 12/2002 | Ceniza | 370/401 |
| 2003/0012204 | A1 * | 1/2003 | Czeiger et al. | 370/401 |
| 2003/0043853 | A1 * | 3/2003 | Doyle et al. | 370/489 |

OTHER PUBLICATIONS

Jerry D. Gibson, Ed., "The Communications Handbook," IEEE CRC Press 97, Rao, Ramesh R. Chapter 43, "Ethernet Networks" pp. 591-596.
Jerry D. Gibson, Ed., "The Communications Handbook," IEEE CRC Press 97, Palais, Joseph C. Chapter 54, "Fiber Optic Communications Systems," pp. 731-735.
Ethridge, Barry, Adcox, Tim, "Fiber to the Home, Data Connectivity" Marconi Access Systems North America, 2000.
L. Mamkos, K. Lidl, J. Evarts, D. Carrel, D. Simone, R. Wheeler, "RFC2516: Method for Transmitting PPP Over Ethernet" Internet RFC/STD/FYI/BCP Archives, 1999, pp. 1-12.

* cited by examiner

Primary Examiner — Aravind Moorthy

(57) ABSTRACT

The present invention provides methods to mitigate the problems associated with MAC address spoofing and denial of service attacks in an FTTH network system. The MAC address spoofing attack may occur when a computer hacker configures his computer to change the MAC address of a data signal to deceive the receiver of the signal's source address. The denial of service may occur when a computer hacker floods a file server with data packets. The present invention mitigates these attacks by modifying the software of certain components of the FTTH network system to enable the components to insert virtual MAC addresses, tags and codes into the data packets that identify a component of the communication related to the address of the source computer.

32 Claims, 3 Drawing Sheets

METHODS TO MITIGATE ATTACKS AGAINST FIBER-TO-THE-HOME NETWORK SYSTEMS

REFERENCE TO EARLIER FILED APPLICATION

This application claims the benefit of U.S. Provisional Application No. 60/332,904, filed Nov. 14, 2001, which is hereby incorporated by reference.

STATEMENT OF GOVERNMENT INTEREST

The present invention was not made with government support and the government has no rights in this invention.

BACKGROUND OF THE INVENTION

1. Field of the Invention

The present invention relates generally to the field of fiber-to-the-home network systems and, more specifically, to methods to mitigate the media access control address spoofing attacks and denial of service attacks against fiber-to-the-home network systems.

2. Description of the Related Art

Fiber to the Home (FTTH) is a network system that provides high-speed information services from a remote supplier of data (e.g., a file server) to a subscriber's home using optical signals transmitted through fiber optic cable. The data may comprise voice, video or data. Information is transmitted in the form of an optical signal, thereby taking advantage of the benefits of using fiber optic technology. It is well known in the art that light transmitted in a glass fiber can carry more information faster, with smaller transmission losses, and over longer distances than electrical signals can carry in a copper or coaxial medium.

One example of a system that used FTTH technology is the Deep Fiber FTH-1000 system proposed by Marconi Communications. See Ethridge and Adcox, "Fiber to the Home Data Connectivity," Marconi Access Systems North America (October 2000). The system architecture of the FTH-1000 system is depicted in FIG. 1 of Marconi, which shows the interconnections between various sub-components of a Point of Presence (PoP) (i.e., the central office of a telephone company (Telco)), a plurality of passive optical splitters (POS) situated outside the Telco central office and a plurality of Residential Locations. Through each POS, a single fiber emanating from the PoP serves four subscribers' homes. Each home includes an optical-to-electrical converter (OEC), which converts optical signals from the POS to electrical signals, and provides those signals to appropriate physical terminations for voice, video and Ethernet data. In this manner, the OEC may support connections for Plain Old Telephone Service (POTS), Cable TV, direct broadcast satellite (DBS) and a local area network (LAN) of computers.

Conventionally, FTTH systems use an industry protocol called Point-to-Point Protocol over Ethernet (PPPoE) to provide the subscriber's data services. This protocol is described in RFC 2516, "A Method For Transmitting PPP Over Ethernet (PPPoE)," © The Internet Society (1999). PPPoE allows subscribers that share a common facility to use a common Digital Subscriber Line (DSL), cable modem, or wireless connection to the Internet. PPPoE has the advantage that neither the Telco nor the Internet Service Provider (ISP) needs to provide any special support. Unlike dial-up connections, DSL and cable modem connections are "always on." Since a number of different subscribers are sharing the same physical connection to the file server, the protocol is necessary to keep track of which subscriber the data is provided to, and which subscriber is billed for the use of such data.

PPPoE provides the ability to connect a network of subscriber host computers (Host) over a bridge to one of several file servers. As used herein, a bridge is a device that connects and passes packets between two network segments that generally use the same communications protocol. A bridge also allows a larger network to be segmented into smaller, more efficient networks. The bridge monitors the information traffic on both sides of a network so that it can pass data packets of information to the correct location, listens to the network, and automatically figures out the address of each computer on both sides of the bridge. A file server, as described in more detail below, is generally a very fast computer that stores the data and provides the data, upon request by a subscriber, to a Host.

The PPPoE has two distinct stages: a Discovery stage and a PPP Session stage. A Host must first perform discovery to identify the Ethernet Media Access Control (MAC) address of the file server and establish a PPPoE Session identification number to initiate the PPPoE Session stage. Because there may be more than one file server with which the Host can communicate, the Discovery stage allows the Host to discover all the available file servers and to select one. When the Discovery stage is successfully completed, both the Host and the selected file server have the information necessary to establish their point-to-point session.

The Discovery Stage, in more detail, requires that four steps be completed. Step one: the Host broadcasts a PPPoE Active Discovery Initiation (PADI) packet. Each PADI packet contains the Host's MAC address, and one or more tags indicating the service that the Host is requesting. Step two: one or more file servers send PPPoE Active Discovery Offer (PADO) packets. Step three: the Host reviews the PADO packets received from the file servers, chooses one and sends a unicast PPPoE Active Discovery Request (PADR) packet to the selected file server. Step four: the selected file server generates a unique Session Identification Number (Session ID) and sends a PPPoE Active Discovery Session confirmation (PADS) packet to the Host. After completing these four steps, both the Host and the file server know the Session ID and each other's MAC address, which together uniquely define the PPPoE session.

After the file server sends the PADS packet, it may proceed to the PPP Session stage. In addition, after the Host receives the PADS packet, it may proceed to the PPP Session stage. Once the PPPoE Session begins, PPP data is sent as in any other PPP protocol. The Session ID may not change during the PPPoE Session, and must remain the identification number assigned in the Discovery stage.

Despite its general suitability for some applications, a conventional FTTH system has several drawbacks, most notably its vulnerability to certain forms of attack. For example, in a MAC address spoofing attack, a computer hacker may configure his computer to send PADI packets with spoofed (false) MAC addresses to deceive a receiver of the PADI packet's source. In addition, a denial of service attack may occur when a computer hacker sends an abnormally large number of these PADI packets having the spoofed MAC addresses to a targeted file server such as for example, when the number of PADI packets received at the file server is above a threshold level set by the file server's software. The abnormally large number of PADI packets originating from a source computer and being transmitted to a device (e.g., a file server) in the communication system is known by those skilled in the art as "flooding." Flooding is detected based on the settings in the software of the device that is receiving the data. For example, if a file server normally receives 500 PADI packet requests during a 1-hour period, the software may be configured to actuate an alarm when more than 500 PADI packet requests are received. In response to the flooding, the file server allocates all its available memory to process the PADI packets. After all the available memory in the file server has been allocated, no additional PADI packets can be processed. Consequently, existing subscribers are unable to receive ongoing data services and new subscribers are thereafter unable to log on. Due to the cessation of data transfer between the file server and Hosts when flooding occurs, an alarm is actuated at the central office of the Telco to inform the network administrator of the flooding condition and an investigation is initiated by Telco personnel to determine the source of the flooding. These investigations, however, are not only time consuming but they are also difficult because the PADI packets contain false identifying information such as the spoofed MAC addresses and tags that do not associate the PADI packets with the source computer.

There is a need, therefore, for an FTTH system that takes an entirely fresh approach, and provides an adequate measure of protection against such MAC spoofing attacks, denial of service attacks and the like.

SUMMARY OF THE INVENTION

An object of the present invention is to provide a method in a communication system to mitigate against a spoofing attack of a source computer's address. The method includes the steps of maintaining a plurality of virtual addresses in a component of the communication system associated with the source computer, and in an information packet sent by the source computer, replacing an address of the information packet with a selected one of the plurality of virtual addresses.

Another object of the present invention is to provide a method in a communication system to mitigate denial of service attacks by a source computer. The method includes the steps of inserting an identifier into information packets sent from a source computer, detecting a number above a threshold level of information packets containing the inserted identifier, removing the identifier from the information packets, and identifying a component of the communication system associated with the source computer based on the identifier obtained from the removing step.

A further object of the present invention is to provide a method in a communication system to mitigate denial of service attack by a source computer. The method includes the steps of inserting an identifier and code into information packets sent from a source computer, detecting a number above a threshold level of information packets containing the inserted identifier and code, removing the identifier and code from the information packets, and identifying a component of the communication system associated with the source computer based on the identifier or code obtained from the removing step.

DETAILED DESCRIPTION OF THE PREFERRED EMBODIMENTS

Figure 1:
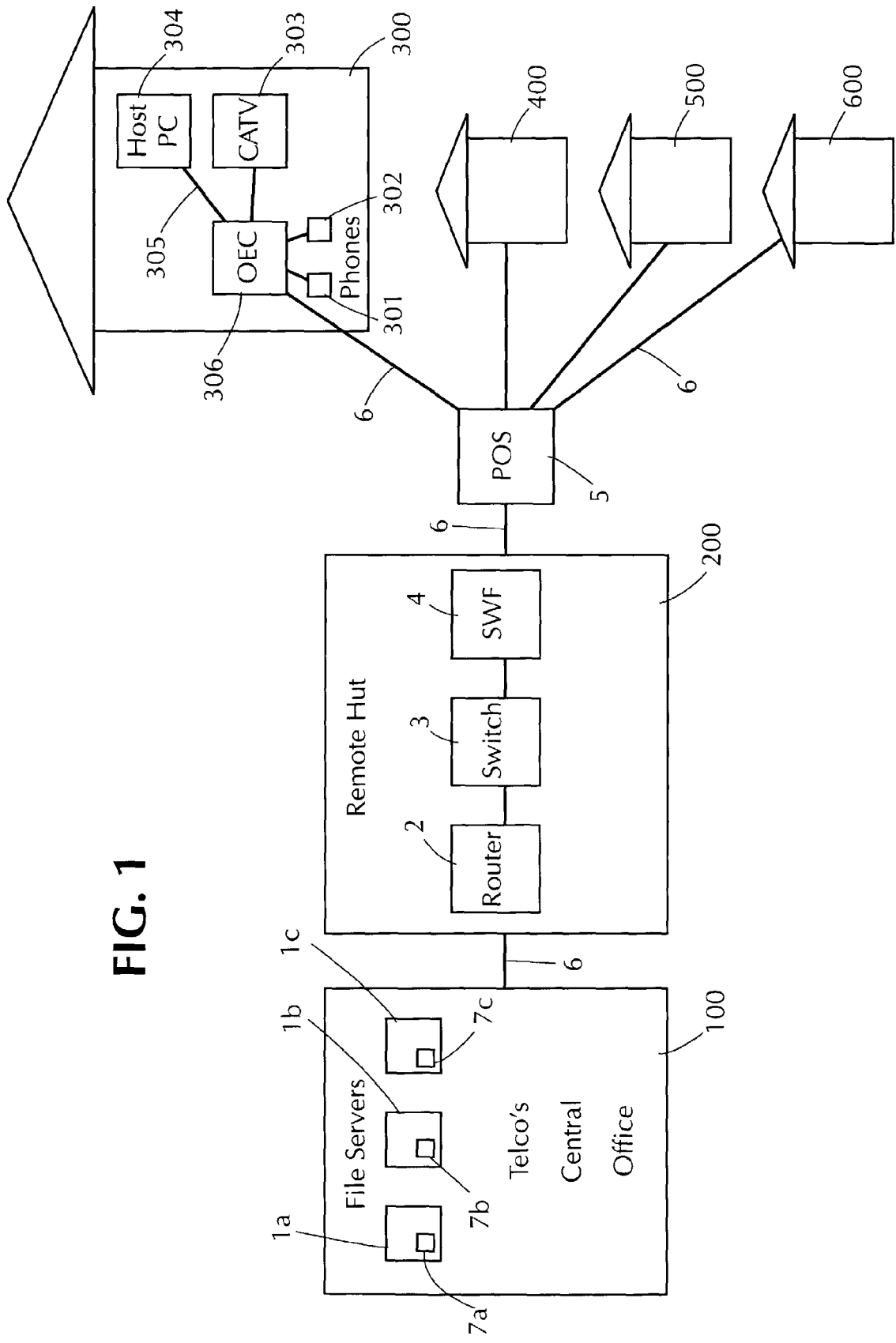
FIG. 1 is a drawing showing the overall architecture of the FTTH network system of the present invention.

The overall architecture of the network system of the present invention is shown in FIG. 1. In general, file servers (sometimes called Access Concentrators) 1a, 1b, 1c located at a Central Office 100 exchange optical signals containing data with residential telephone service subscribers via a network of optical fiber links 6. This network includes common networking hardware, known in the art, that ensures efficient delivery of the optical signals to the subscriber's premises. Each file server 1a, 1b, 1c may comprise generally a high speed computer, a memory and a network interface card 7a, 7b, 7c (NIC), and provides the necessary data services to the subscribers' homes 300, 400, 500 and 600. Computers residing in a subscriber's home, such as for example Host computer 304 located in home 300, also include NICs, typically situated in an expansion slot, such as a PCMCIA expansion slot. The network operating system, which handles all Telco communications including the immediate communications with a subscriber, resides on file servers 1a, 1b, 1c.

Figure 2:
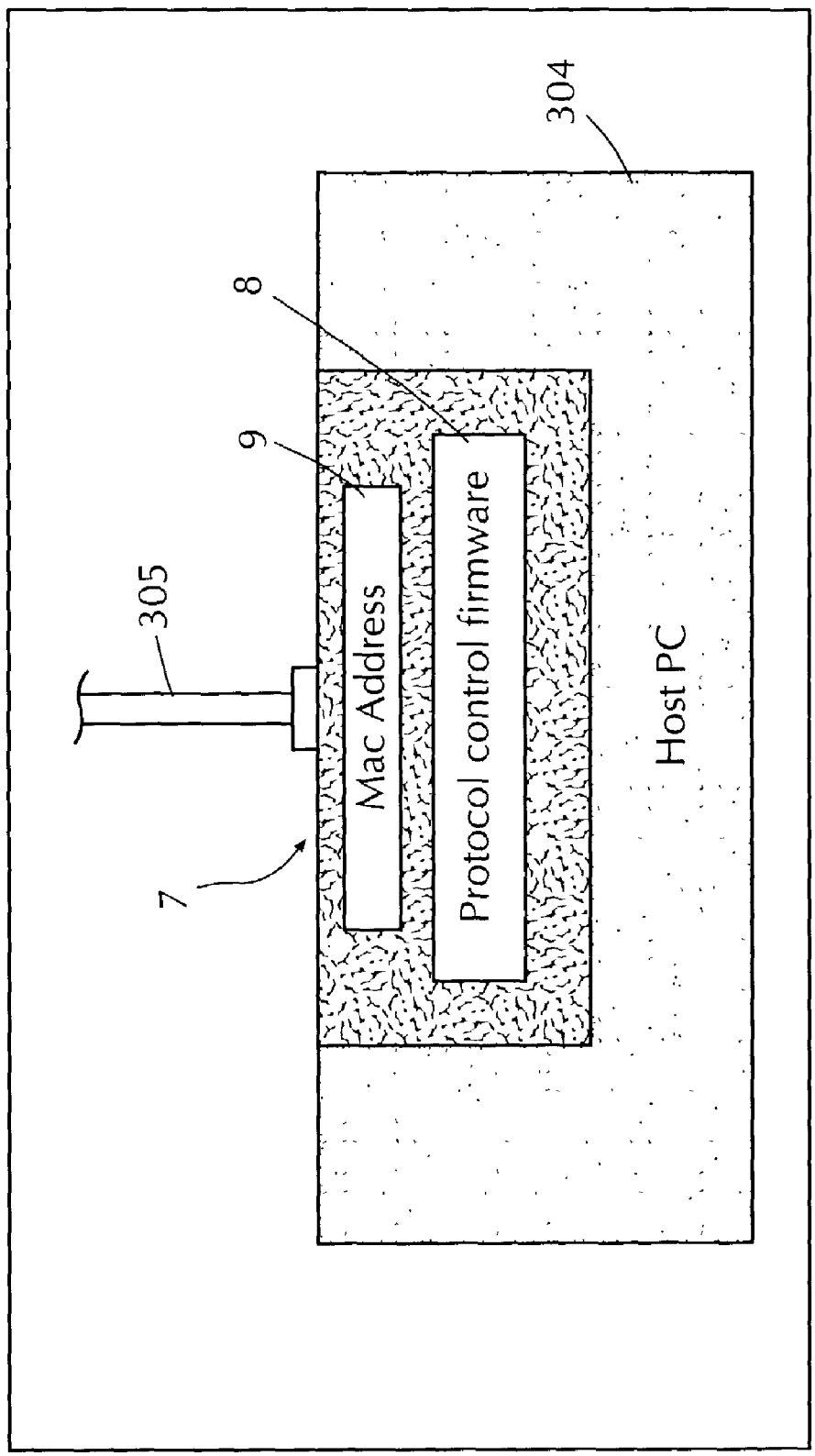
FIG. 2 is a drawing showing a network interface card.

FIG. 2 illustrates the general structure of a NIC 7, which provides the physical connection between the network and a Host. The NIC 7 includes protocol control firmware 8 that supports the Ethernet MAC datalink protocol, and a MAC address 9, which is normally stored in a programmable read only memory (PROM). While most NICs 7 are located inside the computer, they can be located outside the computer as well, such as, for example, in an external transceiver. The NICs 7 perform a number of control functions in software, including the execution of the PPPoE protocol described above, for exchanging packets of information.

Each NIC 7 is assigned a MAC address 9 by its manufacturer. MAC addresses include a source address that is globally unique and are assigned in blocks to the NIC 7 manufacturers. This scheme ensures that no two NICs 7 will ever have the same source address. MAC addresses are 48 bits, expressed as 12 hexadecimal digits and normally hyphenated by octets (e.g., 12:34:56:78:9 A:BC). The first 6 digits of the MAC address identify the vendor of the NIC 7 while the last 6 digits identify the NIC's 7 serial number. For example, the first 6 digits 08:00:20 correspond to a NIC 7 manufactured by Sun Microsystems. While MAC addresses were designed to uniquely identify a particular NIC 7, it is well known in the art that these MAC addresses can be easily changed by simply actuating a command inside the computer to change the MAC address, thereby, in essence, lying about the source of a data packet.

Figure 3:
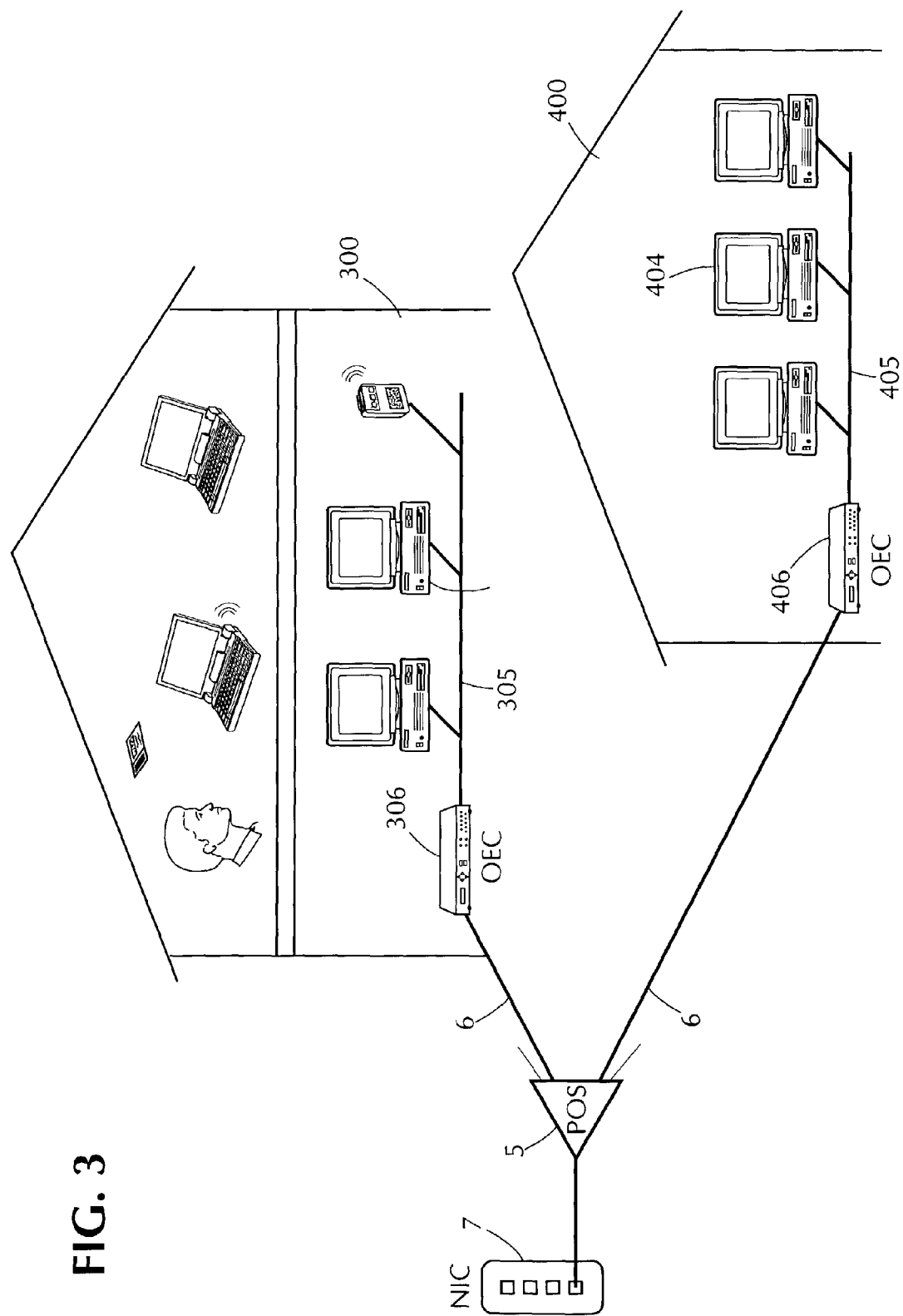
FIG. 3 is a drawing showing two homes' connections to certain components of an FTTH system.

Conventionally, a PADI packet will also include one or more tags along with the MAC address. As used herein, a tag is identifying information that is inserted into a data packet to provide additional information about the data, such as for example, its source or destination address. A tag may be inserted into a data packet by one or more components of the FTTH system such as for example, by a file server 1, by a Host 304, or by a hacker's computer 404 (FIG. 3). There are various types of tags that can be inserted into a data packet, such as the tags listed in Appendix A of RFC 2516, "A Method For Transmitting PPP Over Ethernet (PPPoE)."

For example:
  a "0x0101" Service Name tag indicates that a service name follows such as an ISP name, class or quality of service;
  an "0x0102" AC-Name tag indicates that a string follows which uniquely identifies a file server 1 and may comprise a combination of trademark, model and serial id information, or simply a UTF-rendition of the MAC address of the box;
  a "0x0103" Host-Uniq tag is used by a Host 304 to uniquely associate a PADO or PADS from the file server 1 to a particular PADI packet or PADR Host 304 request. The tag value is binary data of any value and length that the Host 304 (or hacker's computer 404) chooses and is not interpreted by the file server 1. The Host 304 may include a Host-Uniq tag in a PADI packet or PADR. If, however, the file server 1 receives this tag, it must include the tag unmodified in the associated PADO or PADS response. While the Host-Uniq tag is useful, since the hacker's computer 404 chooses the tag, it is within the hacker's control and can be easily changed to deceive the receiver (e.g., a file server 1) of the real source of the data packet. In addition, the file server 1 only serves to relay this tag back to the hacker's computer 404 since it does not interpret this tag and may not modify the tag in the PADO or PADS;

an "0x0104" AC-Cookie tag is used by a file server 1 to aid in protecting against denial of service attacks. The file server 1 may include this tag in a PADO packet. If a Host 304 receives this tag, it must return the tag unmodified in the following PADR. The tag value is binary data of any value and length and is not interpreted by the Host 304;

a "0x0105" Vendor-Specific tag is used to pass vendor proprietary information. The first four octets of the tag value contain the vendor id and the remainder is not specified;

a "0x0110" Relay-Session-ID tag may be added to any discovery packet by an intermediate agent that is relaying traffic. The tag value is opague to both the Host 304 and the file server 1. If either the Host 304 or file server 1 receives this tag, they must include it unmodified in any response. All PADI packets must guarantee sufficient room for the addition of a Relay-Session-ID tag with a tag value length of 12 octets. A Relay-Session-ID tag must not be added if the discovery packet already contains one. In that case, the intermediate agent should use the existing Relay-Session-ID tag. If it cannot do so, or if there is no room to add a Relay-Session-ID tag, then it should return a Generic-Error tag to the sender;

a "0x0201" Service-Name-Error tag indicates that for one reason or another, the requested Service-Name request could not be honored;

an "0x0202" AC-System-Error tag indicates that the file server 1 experienced some error in performing the Host's 304 requests and may occur, for example, when there are insufficient resources to create a virtual circuit;

a "0x0203" Generic-Error tag indicates an error and may be added to a PADO, PADR, or PADS packets when an unrecoverable error occurs and no other error tag is appropriate; and an "0x0000" End of List tag indicates that there are no further tags in the list.

Referring again to FIG. 1, a Remote Hut 200 is located between the Central Office 100 and a subscriber's home 300. The Remote Hut 200 may include a router 2 and switch 3, which control the routing and flow of data through the network. The router 2 directs where data travels, that is, the path traveled by the data through the network. The switch 3 controls when data travels, that is, the timing and rate of the flow of data. The router 2 selects the best path for the data to travel, based on the data's source and destination address. The router 2 can also direct traffic to prevent the head-on collisions of data, which occur when data from two separate computers converge simultaneously at the same node in a network. The Remote Hut 200 may also include a splitter wavelength division multiplexing frame device 4 (SWF), which combines voice and data signals having a certain wavelength with video signals having differing wavelengths. The Remote Hut 200 may further include a central connection point for cables from the file servers and Hosts, and may include a repeater, which amplifies the received signals.

A POS 5 is located outside the Remote Hut 200, most likely close to subscribers' homes 300, 400, 500 such as for example, on a local telephone pole. In the system of FIG. 1, a single primary fiber entering the POS 5 exits as four separate secondary fibers, each of which provides data to a subscriber's home. The POS 5 is referred to as a "passive" device because the optical data entering and exiting the device is neither increased nor decreased as it goes through the POS 5. It will be readily understood by those skilled in the art that the number of secondary lines exiting a POS may vary from one residential community to another.

Referring again to FIG. 1, optical signals enter the subscriber's home 300 and OEC 306 located therein. The OEC 306 converts the fiber optic signal to an electrical signal that is transmitted through electrical wiring 305, 405 (e.g. twisted pair electrical wiring) in a subscriber's home 300, 400, 500, 600 to the subscriber's home telephones 301, 302, cable television 303 and Host 304 for processing. It will be readily understood by those skilled in the art that the device coupling the source computer to the communication system may also comprise an optical-to-optical converter or an optical-to-wireless converter for radio frequency implementations.

A first embodiment of the present invention solves problems related to a MAC address spoofing attack. FIG. 3 is a simplified diagram of two homes 300, 400 and their connections to various components of the FTTH system. For example, home 300, which is occupied by a subscriber of services, and home 400, which is occupied by a computer hacker, each includes a Host and an OEC that are connected outside the homes to a common POS 5, and from there to a NIC 7 of a file server 1 (not shown in FIG. 3). A MAC address spoofing attack occurs when a computer hacker configures his computer 404 to send information packets that have spoofed MAC addresses. As used herein, a "spoofed" MAC address is a false MAC address that deceives a receiver of the information packet as to the information packet's correct source while an "actual" MAC address of an information packet identifies the correct source of the information packet. For example, a computer hacker may configure his computer 404 to send thousands of PADI packets from his computer, with each PADI packet containing a spoofed MAC address. By doing so, the receiver (e.g., a file server 1) of these PADI packets will not be able to determine the PADI packet's correct source address.

In accordance with this embodiment of the present invention, all OECs maintain in their software a table of virtual MAC addresses that are unique, known only by OECs and file servers, specified by the OEC's software, and used by the OECs to replace all the MAC addresses (e.g., spoofed or actual addresses) sent from the Hosts. In particular, the virtual MAC addresses will replace the spoofed MAC addresses generated and sent from the computer hacker's terminal 404. With this scheme the OEC 406 will override each MAC address and replace it with a virtual MAC address, regardless of how the computer hacker configures his computer 404 to change the MAC address of each data signal. Thereafter, the data signal with the virtual MAC address will travel throughout the FTTH system, to the file server 1 and eventually back to OEC 406. At that point, the OEC 406 will effectively translate the virtual MAC address back to the spoofed MAC address generated by the computer hacker. This embodiment improves the management functionality of the FTTH system because the Telco can determine the OECs that the data signals traveled through. Since the OECs are located in a Host's home 300, 400, 500, the source address of the data signal can be readily determined. In addition, as described below, if a denial of service attack occurs, the Telco will be able to quickly locate the OEC and disconnect the computer hacker from the FTTH system.

A computer hacker can configure his computer 404 to flood a file server 1 with PADI packets containing spoofed MAC addresses at the Telco's central office 100, thereby denying continuing service to existing users and preventing new users from establishing a PPPoE session. A second embodiment of the present invention provides a method to mitigate a denial of service attacks to a Host when a computer hacker floods the file server 1 with PADI packets containing spoofed MAC addresses. In this description of the second embodiment of the present invention, we assume that the method described in the first embodiment to mitigate spoofing attacks of a MAC address of a source computer is not being used, thus the spoofed MAC addresses deceive the receiver (e.g., file server 1) of the information packet as to the correct source of the information packet.

In accordance with the second embodiment of the present invention, the above-described problem is solved by modifying the software associated with the OECs to cause all the OECs in the FTTH system to insert tags in each PADI packet passing through an OEC, and by configuring the software associated with the file servers 1a, 1b, 1c to cause them to actuate an alarm when flooding is detected. Flooding may be detected by having the software of the file servers 1a, 1b, 1c set a threshold level for the number of information packets normally received by the file servers 1a, 1b, 1c at a particular time during the day. If the threshold level is exceeded, the alarm is sounded, the PADI packets containing the same insert tag are identified, and the tags are removed. These tags will then be used in a follow-up investigation by Telco personnel to determine the correct source of the PADI packets. The preferred tag for this embodiment is an ID tag that provides the serial number of an OEC such as for example, the hacker's OEC 406. As shown in FIGS. 1 and 3, the OECs are located inside homes 300, 400, 500 and allow the Telco to quickly determine and disconnect the source of the flooding from the FTTH system. Serial numbers of other components of the FTTH system may be used, such as for example, the serial number of a router 2 (not shown in FIG. 3). However, since the router 2 is located in the Remote Hut 200 and not inside the hacker's home 400 like the OEC 406, it is more difficult to associate the router 2 with a hacker's computer 404.

An example will now be provided to further understand the aspects of this second embodiment of the present invention. A computer hacker sitting at his computer 404 may configure his computer 404 to send out 750 PADI packets containing spoofed MAC addresses to file server 1. The file server 1, under normal circumstances, would only receive 500 PADI packets. For purposes of this example, it is assumed that the additional 250 PADI packets sent to the file server 1 will flood the file server 1 and may consequently, deny service to existing and new users. The computer hacker configured his computer 404 to send spoofed MAC addresses with each of the 750 PADI packets. Therefore, a receiver of the information packets containing the spoofed MAC addresses will not know the correct source of the information packet. In the second embodiment of the present invention, as the PADI packets pass through the OEC 406, the OEC 406 automatically inserts a tag in the PADI packet, which, for purposes of this example, will identify the serial number of OEC 406. Although each one of the 750 PADI packets has a different MAC address, each will contain the same tag identifying the serial number of OEC 406 inserted into it. After flooding is detected, an alarm will be actuated, the file server 1 will remove the tag from the PADI packet, and display the serial number of the OEC 406, which will be used by Telco in their follow-up investigation of the flooding incident. This embodiment has the added benefit that mitigating these denial of service attacks will improve the management functionality of the entire FTTH system by removing the computer hacker from the network.

A third embodiment of the present invention provides another method to mitigate the problem associated with the denial of service attack when a computer hacker floods a file server 1 with PADI packets containing spoofed MAC addresses. In the description of the third embodiment of the present invention, we assume, as we did in the second embodiment, that the method described in the first embodiment to mitigate spoofing attacks of a MAC address of a source computer is not being used herein, thus the spoofed MAC addresses deceive the receiver (e.g., file server 1) of the information packet as to the correct source of the information packet.

The method of this embodiment is similar to the method of the second embodiment, in that it requires that the software for the OEC 306 and file server 1 be modified to have the OEC 306 insert in each PADI packet a certain tag, have the file server 1 remove the tag from the PADI packet when flooding occurs, and have the tag's information outputted to Telco personnel for further investigation. However, this third embodiment provides an additional level of security to the FTTH system by denial of service attacks by including with a tag described in the second embodiment a cryptographic message authentication code that is unique to OECs and file servers and may include, for example, a symmetrical key or pair of public keys. By so doing, even if a computer hacker can get access to the OEC and change a tag's information, he will not be able to change the cryptographic message. Therefore, if flooding occurs, the Telco personnel will be able to identify the OEC by the cryptographic message unique to the OEC and will be able to disconnect the computer hacker from the FTTH system.

It will be readily understood by those skilled in the art that the method of mitigating MAC address spoofing attacks as described in the first embodiment of the present invention can be used in combination with the methods of mitigating denial of service attacks as described in the second and third embodiments of the present invention to improve the management functionality of the entire FTTH system by identifying a source computer that is flooding file servers 1a, 1b, and 1c, and subsequently removing the computer 404 from the network.

More generally, the invention has been particularly shown and described with respect to preferred embodiments thereof, it will be understood by those skilled in the art that changes in form and details may be made therein without departing from the scope and spirit of the invention.

What is claimed is:

1. A method, comprising:
maintaining a plurality of virtual addresses in a device coupling a communication system to a source computer;
in the device, replacing an address of an information packet sent by the source computer with one of the plurality of virtual addresses;
sending the information packet through the communication system; and
using the virtual address to identify the device.

2. The method according to claim 1, further comprising:
receiving the information packet at a file server;
sending the information packet back to the source computer via the device; and
in the device, replacing the virtual address with the address of the information packet.

3. The method according to claim 1, wherein the address comprises a spoofed media access control address.

4. The method according to claim 1, wherein the address comprises an actual media access control address.

5. The method according to claim 4, wherein the actual media access control address is maintained in a network interface card associated with the source computer.

6. The method according to claim 1, wherein the plurality of virtual media addresses is stored in a software table of a device coupling the source computer to the communication system.

7. The method according to claim 6, wherein said device includes software that replaces the address of the information packet with a selected one of the plurality of virtual addresses and replaces the selected one of the plurality of virtual address with the address of the information packet.

8. A communication system comprising:
a source computer that sends information packets including a media access control address; and
a device that converts signals representing information packets sent by said source computer into corresponding optical signals suitable for transmission over a fiber optic cable,
wherein said device maintains in a software table a plurality of virtual media access control addresses for replacing the media access control addresses contained in the information packet with a selected one of the plurality of virtual media access control addresses.

9. The communication system according to claim 8, wherein said signals comprise electrical, optical, or wireless signals.

10. A communication system comprising:
means for generating signals representing an information packet that includes an address;
means for replacing the address with a virtual address; and
means for converting said electrical signals into corresponding optical signals suitable for transmission over a fiber optic cable.

11. The communication system according to claim 10, wherein said signals comprise electrical, optical, or wireless signals.

12. In a communication system having a source computer and a destination computer, a method, comprising:
inserting an identifier into information packets sent from the source computer;
at the destination computer, detecting a number above a threshold level of information packets containing the identifier;
removing the identifier from the information packets; and
using the identifier to identify a device of the communication system associated with the source computer.

13. The method according to claim 12, further comprising the step of generating an alarm upon the detection of the number above the threshold level of information packets containing the identifier.

14. The method according to claim 12, wherein the identifier is inserted into the information packets by a device associated with the source computer.

15. The method according to claim 14, wherein the identifier identifies the device.

16. The method according to claim 12, further comprising the step of outputting the identifying information.

17. In a communication system having a source computer and a destination computer, a method, comprising:
inserting an identifier into information packets sent from the source computer;
at the destination computer, detecting an abnormally large number of information packets containing the identifier;
removing the identifier from the information packets; and
using the identifier to identify a device of the communication system associated with the source computer.

18. A communication system comprising:
a source computer that sends information packets into the communication system;
a device that inserts into the information packets an identifier identifying the device and converts signals representing information packets sent by said source computer into corresponding optical signals suitable for transmission over a fiber optic cable; and
a file server that, upon detecting a number above a threshold level of information packets containing the identifier, removes the identifiers from the information packets.

19. The communication system according to claim 18, wherein said signals comprise electrical, optical, or wireless signals.

20. A communication system comprising:
means for generating signals representing information packets;
means for inserting into the information packets an identifier identifying a device;
means for converting said signals into corresponding optical signals suitable for transmission over a fiber optic cable; and
means for removing, upon detecting a number above a threshold level of information packets containing the identifier, the identifiers from the information packets.

21. The communication system according to claim 20, wherein said signals comprise electrical, optical, or wireless signals.

22. In a communication system having a source computer and a destination computer, a method, comprising:
inserting an identifier and code into information packets sent from the source computer;
at the destination computer, detecting a number above a threshold level of information containing the inserted identifier and code;
removing the identifier and code from the information packets; and
using the identifier to identify a device of the communication system associated with the source computer.

23. The method according to claim 22, further comprising the step of generating an alarm upon the detection of the number above the threshold level of information packets containing the identifier and code.

24. The method according to claim 22, wherein the identifier and code are inserted into the information packets by a device associated with the source computer.

25. The method according to claim 24, wherein the identifier or code identifies the device.

26. The method according to claim 22, wherein the code comprises a cryptographic message, symmetrical key, or pair of public keys.

27. The method according to claim 22, further comprising the step of outputting the identifying information.

28. In a communication system having a source computer and a destination computer, a method, comprising:
inserting an identifier and code into information packets sent from the source computer;
at the destination computer, detecting an abnormally large number of information packets containing the inserted identifier and code;

removing the identifier and code from the information packets; and using the identifier to identify a device of the communication system associated with the source computer.

29. A communication system comprising:
a source computer that sends information packets into the communication system;
a device that inserts into the information packets an identifier and code identifying the device and converts signals representing information packets sent by said source computer into corresponding optical signals suitable for transmission over a fiber optic cable; and
a file server that, upon detecting a number above a threshold level of information packets containing the identifier and code, removes the identifiers and codes from the information packets.

30. The communication system according to claim 29, wherein said signals comprise electrical, optical, or wireless signals.

31. A communication system comprising:
means for generating signals representing information packets;
means for inserting into the information packets an identifier and code identifying a device;
means for converting said signals into corresponding optical signals suitable for transmission over a fiber optic cable; and
means for removing, upon detecting a number above a threshold level of information packets containing the identifier and code, the identifiers and codes from the information packets.

32. The communication system according to claim 31, wherein said signals comprise electrical, optical, or wireless signals.

\* \* \* \* \*